June 24, 1930.   H. G. TERZIAN   1,767,564
CARBURETOR FOR CARBURETED WATER GAS APPARATUS
Filed March 1, 1926   2 Sheets-Sheet 1

WITNESS:    INVENTOR
Harutyun G. Terzian
BY
Augustus B. Stoughton
ATTORNEY.

June 24, 1930.  H. G. TERZIAN  1,767,564
CARBURETOR FOR CARBURETED WATER GAS APPARATUS
Filed March 1, 1926  2 Sheets-Sheet 2

WITNESS:
Rob. R. Kitchel.

INVENTOR
Harutyun G. Terzian
BY
Augustus B Stoughton
ATTORNEY.

Patented June 24, 1930

1,767,564

UNITED STATES PATENT OFFICE

HARUTYUN G. TERZIAN, OF PHILADELPHIA, PENNSYLVANIA, ASSIGNOR TO THE U. G. I. CONTRACTING COMPANY, OF PHILADELPHIA, PENNSYLVANIA, A CORPORATION OF DELAWARE

CARBURETOR FOR CARBURETED WATER-GAS APPARATUS

Application filed March 1, 1926. Serial No. 91,440.

In the following description reference will be made to the accompanying drawing forming part hereof and in which—

This invention relates to the manufacture of carbureted water gas.

It has for its principal object the attainment of a higher efficiency in the carbureting of water gas than heretofore, and a more complete utilization of the available combustibles in the water gas set, reducing the amount of heat carried out of the set by the waste gases.

Figure 1:
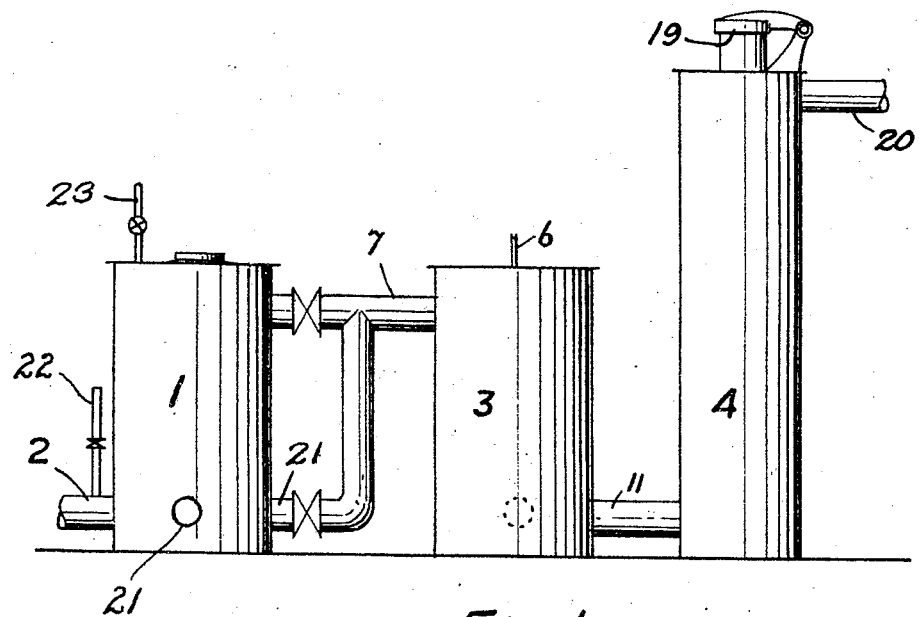
Figure 1 is a diagrammatic and schematic elevational view of a carbureted water gas set.

In the operation of a water gas set, Fig. 1, the fuel in the water gas generator 1 is air blasted, as at 2, and the produced gas generated is burned with secondary air in the carburetor 3 and superheater 4, heating them to the high temperature necessary to carry out the carbureting operation. The blast is then shut off and steam is run from pipe 22 through the highly heated fuel bed in the generator, producing blue water gas, all or part of which is led through the carburetor and superheater. In the carburetor the blue water gas is enriched by spraying oil into it, the oil being vaporized in the carburetor and the oil vapors cracked into fixed gases in the superheater.

It is essential to the economic operation of the set, that the combustibles in the air blast gases be burned as completely as possible in the carburetor and superheater. The more quickly the blast gases ignite on entering the carburetor, and the more rapid the combustion, the more surely will this end be attained. This is especially true in the use of bituminous coal as generator fuel, the blast gases being richer in combustibles than is the case with anthracite coal or coke.

It is also desirable, in the interest of efficiency, that the air blasting operation be as relatively short in proportion to the steaming operation as possible. It is also essential to secure complete vaporization of the carbureting oil in the carburetor.

Another object of the present invention is to attain those ends and for that purpose the invention, generally stated, comprises a carburetor, a single vessel for a single purpose, which may or may not contain checkerbrick, and which comprises a generally cylindrical vessel having a pier arranged therein and terminating short of the top thereof and providing annular space, an oil spray device at the top of the vessel arranged to spray oil clear of the top of the pier to preserve a hot spot at the top of the pier, and air and blast gas inlet provisions at the top of the chamber in proximity with the hot spot. In some cases the pier is hollow and serves to preheat air blast or steam introduced through it and in some cases the pier is solid or operatively so.

The invention also comprises the improvements to be presently described and finally claimed.

Figures 2, 3:
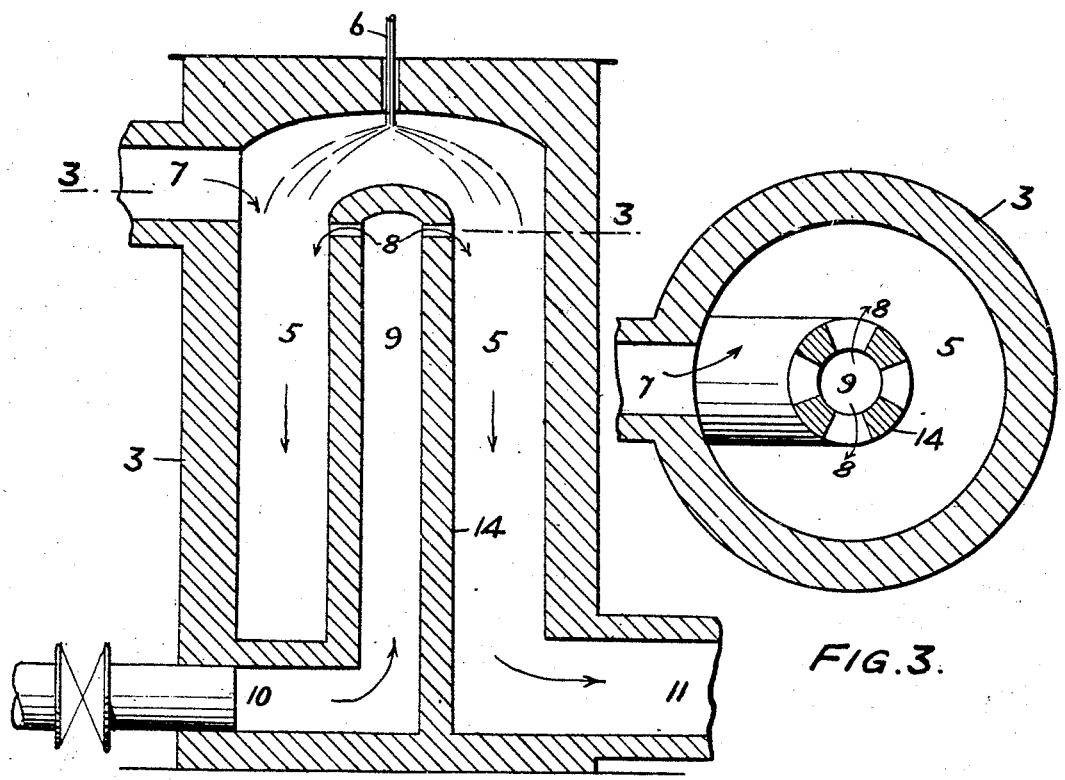
Fig. 2 is a sectional elevational view drawn to an enlarged scale and illustrating a carburetor embodying features of the invention.
Fig. 3 is a sectional view taken on the line 3—3 of Fig. 2.

Referring more particularly to Figs. 2 and 3, the carburetor 3 comprises a generally cylindrical vessel having a pier 14 centrally arranged therein and terminating short of the top thereof and providing an annular space 5. 6 is an oil spray device arranged to spray oil into the annular space 5 clear of the top of the pier. 7 and 8 are blast gas and air inlets near the top of the chamber. The inlets 8 communicate with the hollow interior 9 of the pier through which air blast is introduced as at 10.

Blast gases and the blue water gas from the generator enter the carburetor alternately through the inlet 7. The blast gases and the mixture of blue water gas and oil vapors leave the carburetor alternately through the connection 11, which leads to the superheater. During air blasting of the fuel bed in the water gas generator 1 secondary air is led through the duct 10 into the hollow pier 14.

This secondary air is preheated in the pier and issuing into the carburetor through the ports 8 at the top of the pier, meets the blast gases entering the carburetor chamber through connection 7. The contact of the blast gases with the hot top of the pier, in the presence of preheated secondary air, causes immediate ignition of the gases on entering the chamber, and rapid combustion at the top of the carburetor. This insures a more complete burning of the combustibles in the blast gases by the time they traverse the carburetor and superheater and reduces the amount of unburned combustibles.

Due to the fact that the air supply to the carburetor is preheated, the blast gases on ignition burn with a higher flame temperature than is the case when cold air is used. This increases the temperature differential between the gases and the carburetor, and so increases the proportion of the heat absorbed by the carburetor and base of the superheater. This leaves a smaller proportion of the heat of the blast gases to be absorbed by the top of the superheater, and tends to reduce the temperature there so that less sensible heat is carried out of the set by the gases.

The quick ignition of the blast gases in the top of the carburetor is also advantageous in raising the carburetor and superheater quickly to the desired temperature, and this shortens the time of air blasting.

At the end of the air blasting period, the admission of secondary air through the pier is discontinued.

The blue water gas from the generator enters the carburetor through 7 and the oil is sprayed into the carburetor through 6. It is preferable to use a nebulizing spray. This spray is thrown out in an umbrella form, and thus largely escapes contact with the pier. This insures that the top of the pier will remain hot through the carbureting period, and be in condition to ignite the blast gases on the next blasting period. Although the oil largely escapes contact with the pier, the radiant heat from the hot pier will aid materially in vaporizing the oil.

Figures 4, 5:
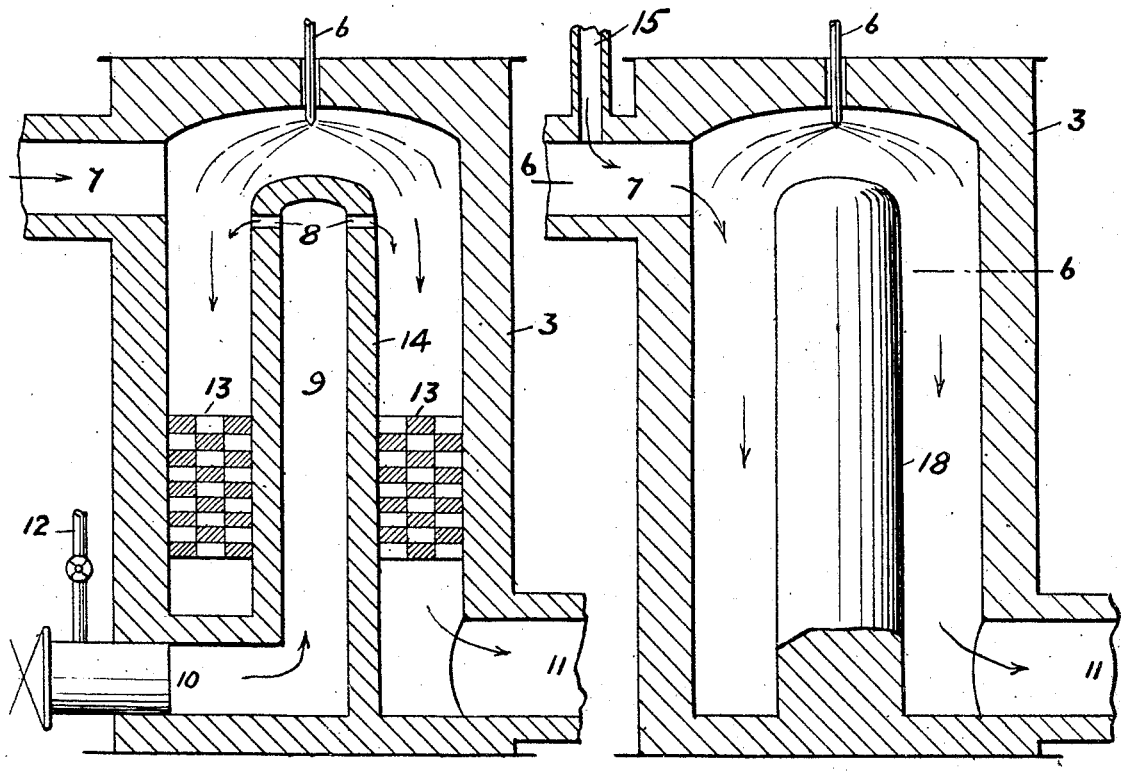
Figs. 4, 5 and 7 are views, similar to Fig. 2, illustrating modifications of the invention.

It is frequently the practice at present to conduct a part of the steaming operation downward through the generator fuel bed, by-passing the blue water gas thus formed around the carburetor and superheater to the holder. In this case, during the steaming operation, all or part of the necessary steam may be introduced into the base of the pier 14 and flow up through the center of the pier out of the ports 8, and then pass through the pipe 7 into the top of the generator, the steam being superheated in its passage through the pier. A steam connection 12 is shown in Fig. 4 for this purpose. In Figure 1, the water gas generator 1 has a steam inlet 23 at the top and a down run blue water gas offtake 21 at the bottom which may lead directly to a wash box or gas holder when desired. The superheater 4 has a blast gas offtake controlled by a stack valve 19 and a carbureted water gas offtake 20 leading to a wash box.

The construction and mode of operation of the modification shown in Fig. 4 are as above described except that some checkerbrick 13 is shown.

Figures 6, 7:
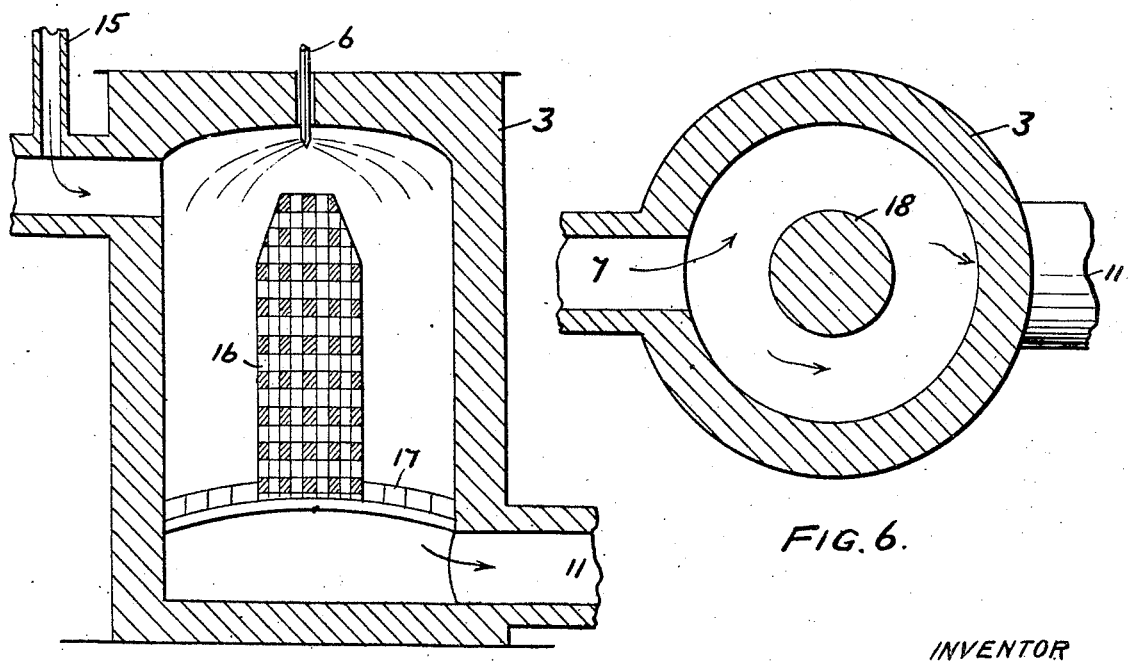
Fig. 6 is a sectional view taken on the line 6—6 of Fig. 5.

The construction and mode of operation of the modification shown in Figs. 5 and 6 are as above described except that the pier 18 is solid and the secondary air is introduced at 15 and may be preheated.

The construction and mode of operation of the modification shown in Fig. 7 are as above described except that the pier 16 is constructed of checkerbrick and mounted upon a checkerbrick or like arch 17.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A carbureted water gas set, comprising a water gas generator in which air blast gas is generated, an air admission conduit for supplying blast air, a generally cylindrical carburetor, the generator being one vessel and the carburetor a second vessel, a pier arranged in the carburetor and terminating short of the top thereof, an oil spray device at the top of the carburetor arranged to spray oil substantially clear of the top of the pier to preserve a hot spot at the top of the pier, and air blast and blast gas inlet connections located near the top of the carburetor in proximity with the hot spot, and both in communication with the interior of the carburetor.

2. A carbureted water gas set, comprising a water gas generator in which air blast gas is generated, an air admission conduit for supplying blast air, a generally cylindrical carburetor, the generator being one vessel and the carburetor a second vessel, a hollow pier arranged in the carburetor and terminating short of the top thereof and spaced from the cylindrical wall thereof, an air connection discharging into the interior of the hollow pier at the lower portion thereof, and air ducts provided through the wall of the pier at the upper portion thereof and leading to the interior of the carburetor, an oil spray device at the top of the carburetor arranged to spray oil substantially clear of the top of the pier, and a gas duct near the top of the carburetor and leading to the interior thereof.

HARUTYUN G. TERZIAN.